US 6,533,108 B1

(12) United States Patent
Ledingham

(10) Patent No.: US 6,533,108 B1
(45) Date of Patent: Mar. 18, 2003

(54) SERPENTINE CLIP

(75) Inventor: Stuart J. Ledingham, Coto de Caza, CA (US)

(73) Assignee: Valu Engineering, Inc., Irvine, CA (US)

( * ) Notice: Subject to any disclaimer, the term of this patent is extended or adjusted under 35 U.S.C. 154(b) by 0 days.

(21) Appl. No.: 09/611,600

(22) Filed: Jul. 7, 2000

(51) Int. Cl.[7] ............................ B65G 15/60; B65G 17/00
(52) U.S. Cl. ............................................. 198/841
(58) Field of Search ................... 198/841; 248/231.71, 248/231.81, 220.6, 220.7, 316.7

(56) References Cited

U.S. PATENT DOCUMENTS

| | | | | |
|---|---|---|---|---|
| 4,222,483 A | * | 9/1980 | Wooton et al. | 198/841 |
| 4,556,143 A | * | 12/1985 | Hohnson | 198/841 |
| 5,009,306 A | * | 4/1991 | Roderick et al. | 198/841 |
| 5,137,145 A | * | 8/1992 | Clopton | 198/841 |
| 5,190,145 A | * | 3/1993 | Ledingham et al. | |
| 5,509,634 A | * | 4/1996 | Gebka et al. | 248/316.7 |
| 5,531,411 A | * | 7/1996 | Adams | 248/65 |
| 5,743,414 A | * | 4/1998 | Baudino | 248/316.7 |
| 5,772,166 A | * | 6/1998 | Adams | 248/231.81 |
| 5,788,056 A | * | 8/1998 | Clopton | 198/841 |
| 5,820,095 A | * | 10/1998 | Stone | 248/316.7 |
| 5,857,560 A | * | 1/1999 | Bjorkholm | 198/841 |
| 6,105,757 A | * | 8/2000 | Ledingham | 198/841 |
| 6,203,878 B1 | * | 3/2001 | Davis et al. | 248/229.11 |

* cited by examiner

Primary Examiner—Christopher P. Schwartz
Assistant Examiner—Devon Kramer
(74) Attorney, Agent, or Firm—Knobbe, Martens, Olson & Bear, LLP

(57) ABSTRACT

A clip designed for use in a conveyor system comprises an upper portion adapted to receive a wear strip and hold it firmly in place, a front portion having a J-shaped clamp adapted to grip to a supporting cross member, and a rear portion adapted for mounting on the cross member. The clip is securely mounted to the cross member and a wear strip is inserted into the upper portion of the clip where it is held firmly, such that the weight borne by the wear strip from the conveyor chain is thereby transferred to the supporting cross member. The clip is designed so as to accommodate varying thickness of cross members and to provide a squaring effect to resist lateral forces from the wear strips.

37 Claims, 6 Drawing Sheets

SERPENTINE CLIP

BACKGROUND OF THE INVENTION

1. Field of the Invention

The present invention relates generally to assembly line and conveyor systems, and in particular, to a clip used to secure supporting elements in a conveyor chain or belt system.

2. Description of the Related Art

Conveyor belts and chains used in various industries are becoming wider to accommodate the requirements for higher production. Wider belts allow for an increased volume of product being moved along the line. Serpentine support systems, described for example in U.S. Pat. No. 5,190,145, are used to support the conveyor belts, particularly along the return way. These serpentine wear strips replace the use of roller return systems, and are particularly useful with wider conveyor belts, as they reduce pulsation and noise, afford even wear and increased belt life, simplify fabrication, and allow for flexible engineering.

As part of the serpentine systems, clips are used to secure various support elements. The earliest versions of these clips secured serpentine wear strips to round rods. These round rods or cross members served as supports for the system, as well as structural connection members for connecting the side frames. As conveyors become wider and support requirements for higher loads are needed, round rods having diameters of 1-inch or less become impractical. Larger diameter rods are required, or alternate configurations are necessary.

Commonly used cross members for wide conveyors are flat angles or channels. These angles or channels are commercially available steel shapes, or formed from sheet metal. The ends of the angles or channels are fastened to the side frames of the conveyor system by welding the members directly to the sides, or by forming or welding a tab at the ends and connecting the tab by bolting through the side frame. Higher loads can be accommodated by using thicker or taller metal cross members.

Current clip designs, intended for use with round cross members, do not allow for the connection of support members to the flat metal angles or channels. Thus, a need exists for a clip having a flexible design that accommodates the varying sizes of cross members necessary in wider conveyor belt systems.

SUMMARY OF THE INVENTION

Described herein is a clip configured for use in a conveyor system which uses a conveyor belt or chain, wear strips which support the belt or chain, and cross members which support the wear strips. The clip is securely mounted to the cross member and a wear strip is inserted into the upper portion of the clip where it is held firmly, such that the weight borne by the wear strip from the conveyor chain is thereby transferred to the supporting cross member. The clip is designed so as to accommodate varying thickness of cross members and to provide a squaring effect to resist lateral forces from the wear strips.

In one embodiment, the clip comprises an upper portion adapted to receive a wear strip and a lower portion adapted to be mounted onto a cross member. The lower portion comprises a J-shaped clamp for receiving an edge of the cross member with the longer leg of the J-shape engaging the upper surface of the cross member. The upper portion of the clip has two arms configured to recline and then grip the wear strip.

The J-clamp has a flat front inner surface to engage the cross member and square the clamp on the member. The clamp is sufficiently resilient so as to expand to accept various thicknesses of the upper surface of the cross member and to grip the cross member firmly. Besides the J-clamp, the lower portion of the clip includes an additional means for attaching to the cross member. Such means include a hole adapted to receive a separate rivet, or a molded rivet integral with the clamp, or button snap as an integral part of the clip. One or more of these can be used in a single clip.

Another embodiment of the present invention includes a rail system for conveyors. The system comprises an elongate synthetic wear strip, a flat or angled cross member adapted to be mounted adjacent a conveyor belt or chain, and a clip. The cross members extend horizontally between the side frames of the conveyor system. The wear strip is preferably shaped in a serpentine configuration. The clip has an upper portion adapted to receive the wear strip and a lower portion comprising a J-shaped clamp for receiving the cross member, whereby the weight of a belt or chain borne by the wear strip is transmitted to the cross member. A plurality of clips can be mounted on a single cross member for supporting a plurality of wear strips.

Yet another embodiment of the invention includes a clip having an upper, generally U-shaped portion, with two arms adapted to grip either side of a wear strip. The lower portion of the clip includes a long leg for engaging a flat upper surface of a supporting cross member, a shorter leg engaging a front edge of the cross member, and attachment means for securing the clip to the cross member. Such attachment means include at least one separate rivet, a fastener formed integral with the leg or a hole adapted to receive a rivet. In one form, the clip lower portion is L-shaped, and in another is J-shaped. Both the J-shaped clamp and the L-shaped clamp have a flat surface, that provides squaring effect to allow the clip to resist lateral forces once mounted on the cross member.

DETAILED DESCRIPTION OF THE PREFERRED EMBODIMENT

The present invention can be incorporated into conveyor systems having various configurations, including various types of chains or belts, single or multiple chains, etc. For simplicity of description and illustration, however, only the potions of the conveyor system that are most closely associated with the present invention are illustrated and described herein.

Figure 1:
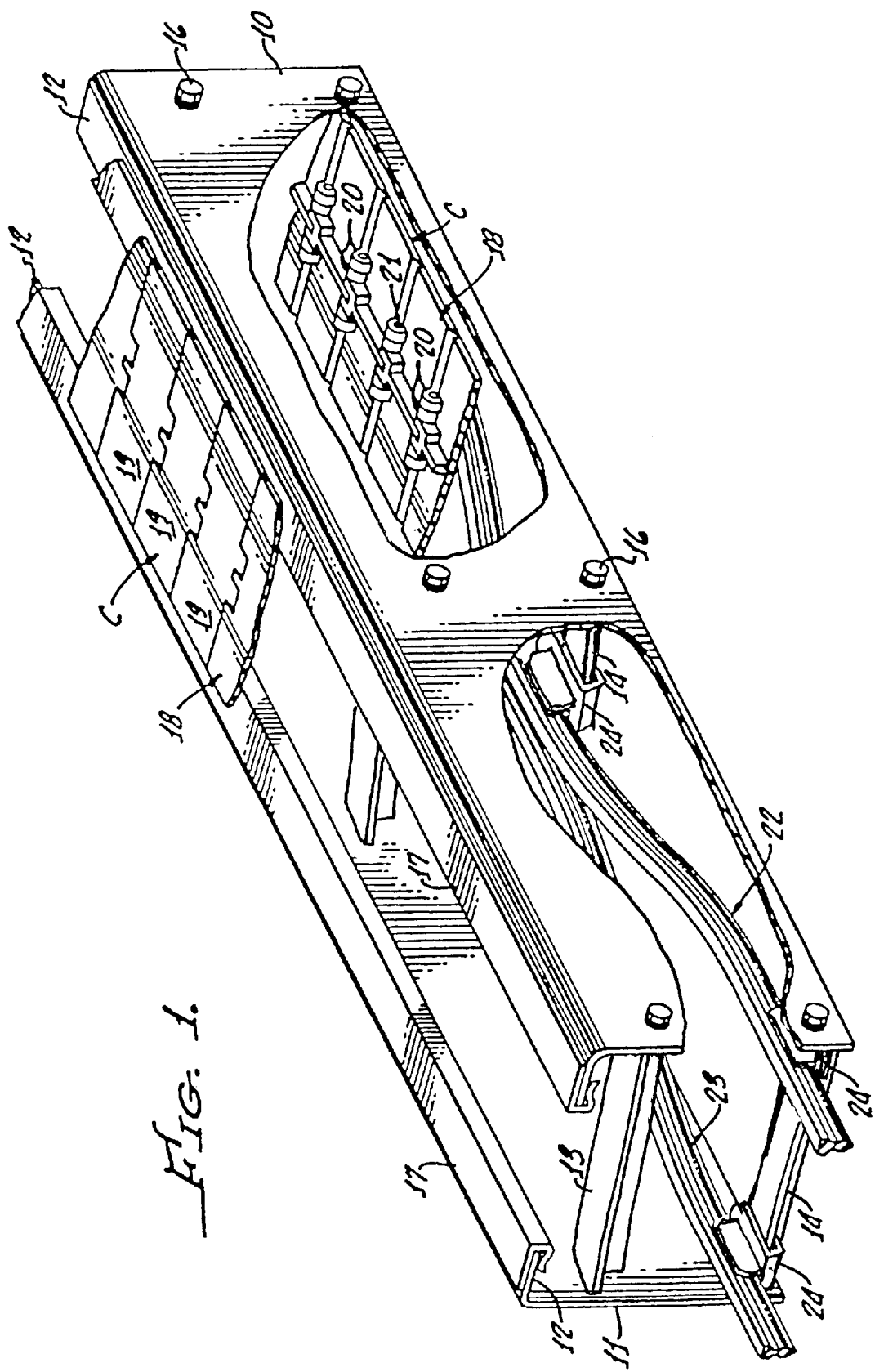
FIG. 1 is a perspective view of a portion of a conveyor, including the return way, with portions of the side frame being broken away so as to show components of the return way system.

Referring first to FIG. 1, a typical section of the main body of a simple conveyor system is illustrated. There are two side frames 10, 11 that are mirror images of each other, each side frame having an upper flange 12 that extends inwardly in a horizontal plane. The side frames 10, 11 are connected together by upper and lower cross members or connectors 13, 14, which act as supports. Commonly used cross members 13, 14 for wide conveyors are angles or channels made from steel or other metal. The flat metal is typically formed into an angle. Thicknesses of the metal range from approximately 0.100 to 0.250 inches. The lower cross members 14 lie in the same horizontal plane and are spaced apart from each other, as illustrated. The cross members 14 are secured to the side frames 10, 11, for example, by welding or bolting 16.

Upper wear strips 17, preferably formed of wear resistant synthetic resin material, are mounted on flanges 12. The J-shaped cross sections of the upper wear strips 17 are such that the strips 17 grip the flanges 12 frictionally and thus remain in position. The preferred wear-strip material is ultra high molecular weight polyethylene (UHMW-PE). A conveyor chain C is provided and goes around suitable sprockets (not shown), some of which are driven by suitable motors (not shown). The illustrated chain C is straight running, but it can be various other types such as sideflexing, etc. In addition, it should be noted that while a chain conveyor C is illustrated, the invention described herein can be used with other types of conveyors, such as modular type belt systems.

The closed-loop conveyor chain C illustrated in FIG. 1 is a commonly used synthetic resin slat type, sold under the trademark TABLETOP. The links of the chain 18 have flat upper surface portions 19 that lie in a single horizontal plane except when the chain C is bending upward or downward around a sprocket. The undersides of the links of the chain have intermeshing bearing (hinge) and other elements 20, the relationships being such that the chain links are pivotally associated with each other by means of pins 21 that extend through bores in registered bearing or hinge elements.

As shown in FIG. 1, the undersides of the end portions of the synthetic resin links 18 slide along the upper horizontal surfaces of the upper wear strips 17. This occurs for any desired length of conveyor, until the upper portion of the chain or belt curves downward around a sprocket and then inverts. The flat upper surface portions 19 of the links 18 are then facing downward, moving along the return system described below.

The lower cross members 14, which serve to space the side frames 10,11 apart from one another, are also used to support elongate, flexible lower wear strips or profiles 22, 23. These wear strips 22, 23 are preferably an extrusion of UHMW-PE, formed into serpentine shapes. Each wear strip 22, 23 has a flat upper surface along which the conveyor chain C rides. The wear strips 22, 23 are mounted on the lower cross members 14, preferably by means of clips 24.

Figure 2:
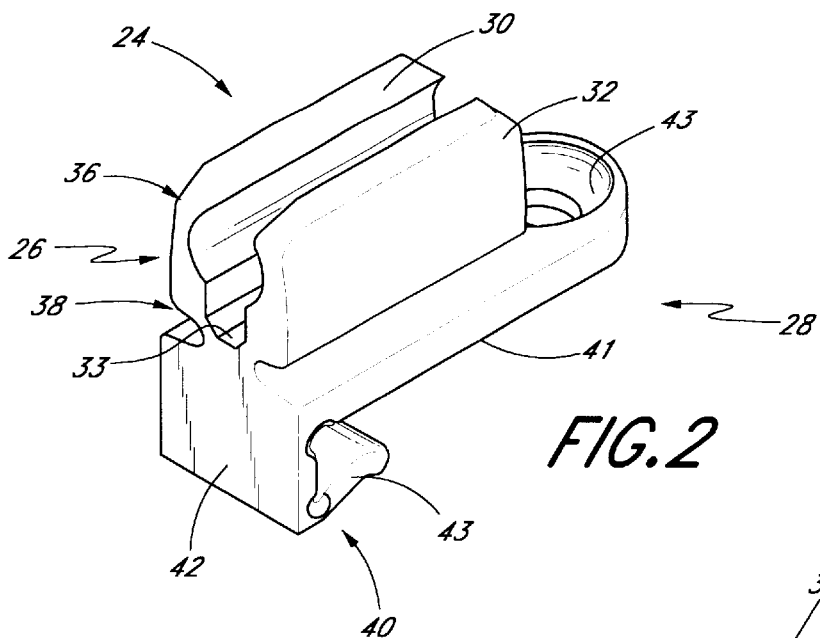
FIG. 2 is a perspective view of a clip used to connect serpentine wear strips and cross members.

Turning now to FIG. 2, there is illustrated a clip 24 in accordance with one embodiment of the present invention. The clip 24 is preferably a strong, resilient molding made of a synthetic resin such as acetal. The preferred acetal is DELRIN 500T, sold by DuPont Corporation. The upper portion 26 of the clip 24 is constructed to receive one of the wear strips in a gripping relationship, while the lower portion 28 is constructed so as to receive and grip a front portion of the lower cross member as well as to be securely fastened to an upper surface of the cross member. The weight borne by the wear strips 22 from the conveyor chain travelling thereon is transferred directly to the cross members 14, as can best be seen in FIGS. 3 and 4.

Referring again to FIG. 2, the upper portion of the clip 26 is generally U-shaped, having two arms 30, 32 joined at the lower ends by a bight or connecting section 33. The arms of the clip 30, 32 are configured to allow a wear strip 22 to be forced or snapped into the space between the arms 30, 32 and held firmly. The arms 30, 32 have opposed beveled edges adapted to receive the bottom edges of the wear strip 34 and secure it therebetween. As can best be seen in FIGS. 2 and 3, the arms of the clip 30, 32 have generally cylindrical concave regions intermediate the upper 36 and lower 38 ends thereof, which are adapted to receive the generally cylindrical convex sides of the wear strip 23 and hold the strip 22 securely in place.

The bottom front portion 40 of the clip 24 is formed in a "J" shape, with a long leg of the J-shape 41 joined integrally with the upper bight section 33, spaced from the open end of the U-shaped upper portion 26. A short leg 43 of the J-shaped lower portion is joined to the long leg 41 by a front bight 42 having a relatively wide inner surface to engage the edge of the cross member 14. Again, the clip 24 is designed so as to be flexible and resilient enough to allow the legs of the J-shaped clamp 40 to spread enough to be forced or snapped onto the cross member 14, while being resilient enough to grip the cross member 14 and to hold it firmly. The clip 24 is also designed so as to be able to accommodate the various thicknesses of the cross members 14.

Figure 3:
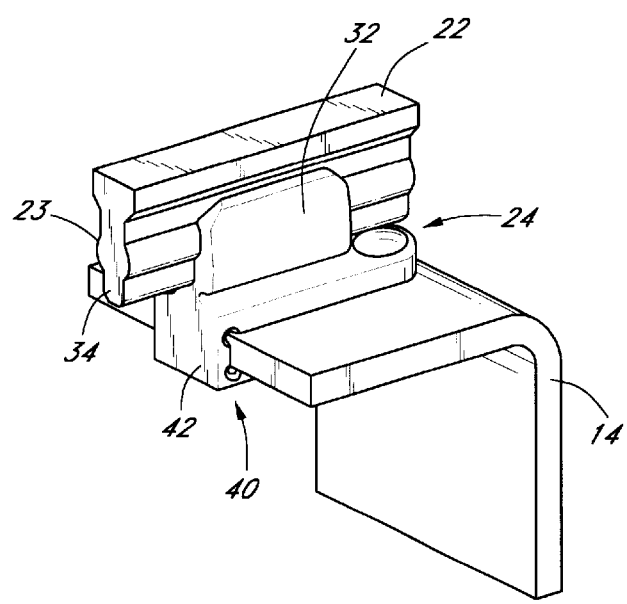
FIG. 3 is a perspective view of the clip illustrated in FIG. 2, mounted on the cross member and having a wear strip mounted thereon.
Figure 4:
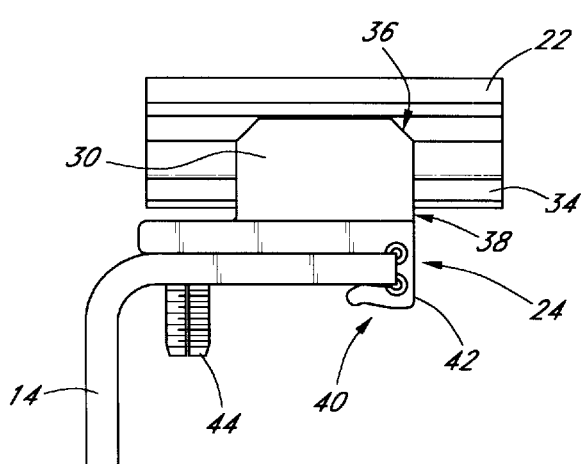
FIG. 4 is a side view of the elements of FIG. 3.

As illustrated in FIGS. 2–4, in one embodiment the clip 24 is formed with a hole 43 in its back, bottom portion, which is designed to receive a rivet 44. The rivet 44 is used for securely attaching the clip 24 to the cross member 14. Although the clip 24 is illustrated having a hole 43 for only a single rivet 44, in an alternate embodiment, two rivets can be used to secure the clip to the cross member. Additional alternate means of securing the clip to the cross member are described below. It should be noted that the combination of the flat inner surface of the bight 42 and the securing means 44 located to the rear of the clip provides a squaring effect for resistance to lateral loads. As seen, the clip is relatively wide relative to the length. The clip 24 provides a consistent connection to the cross member 14 across the length of the clip 24, allowing it to resist these lateral forces from the serpentine wear strips 22.

Figure 5:
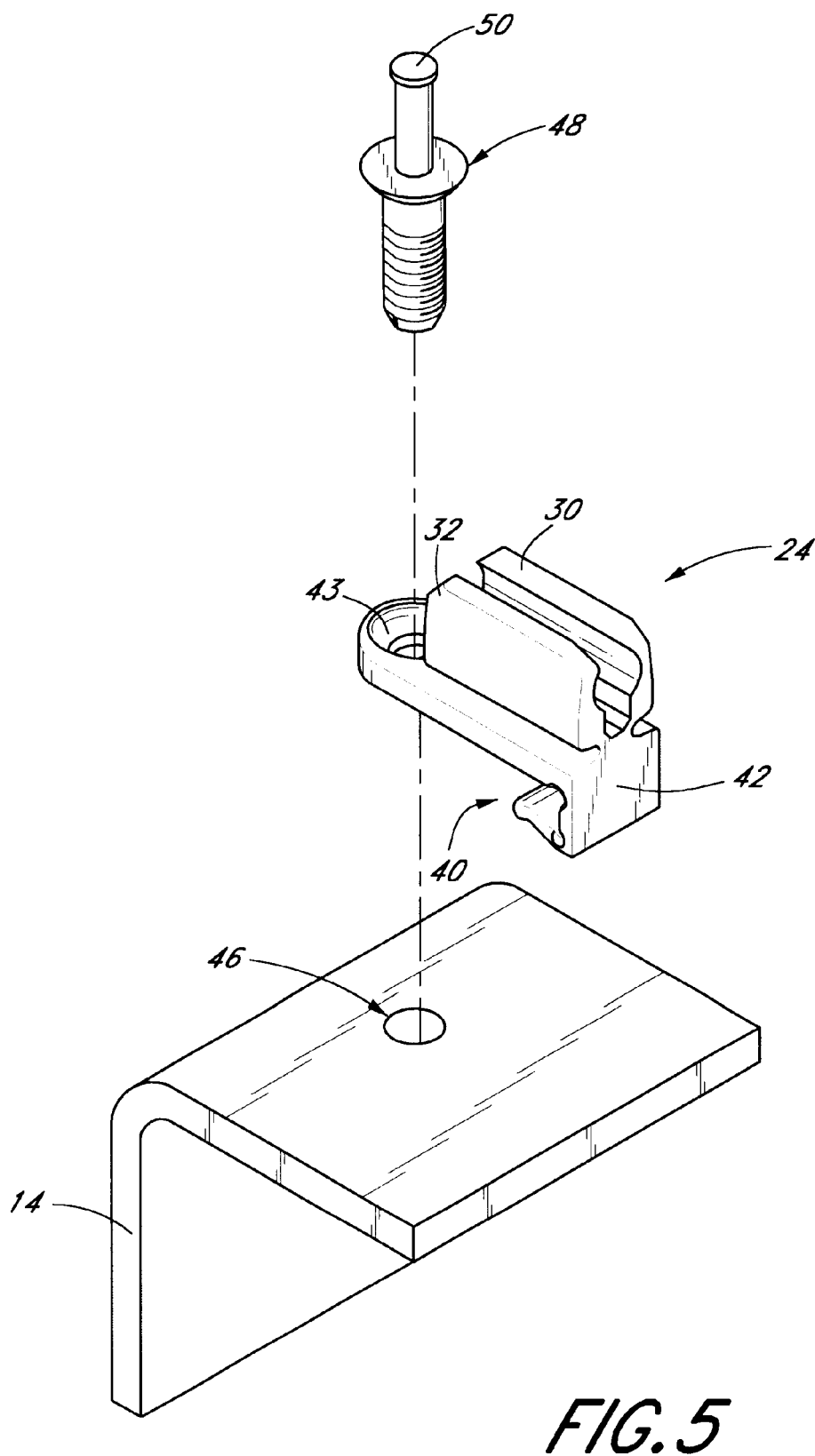
FIG. 5 is an exploded view illustrating how a drive rivet is used to secure the clip on the cross member.

In one embodiment, the rivet used to attach the clip to the cross member is a drive rivet. As shown in FIG. 5, to mount the clip 24 on the cross member 14, a hole 46 corresponding to the size of the hole in the clip 43 is drilled or punched through the upper surface of the metal cross member 14. The front portion of the clip 40 is clamped over the cross member 14 and arranged so that the holes 43, 46 in the clip 24 and cross member 14 are aligned. A drive rivet 48 is inserted through both holes 43, 46, and the drive rivet pin 50 is hammered or otherwise forced down until the rivet pin 50 is flush with the upper surface of the drive rivet 48. The pin 50 forces the two halves of the ribbed portion of the drive rivet apart, securely anchoring the clip 24 to the cross member 14.

Figure 6:
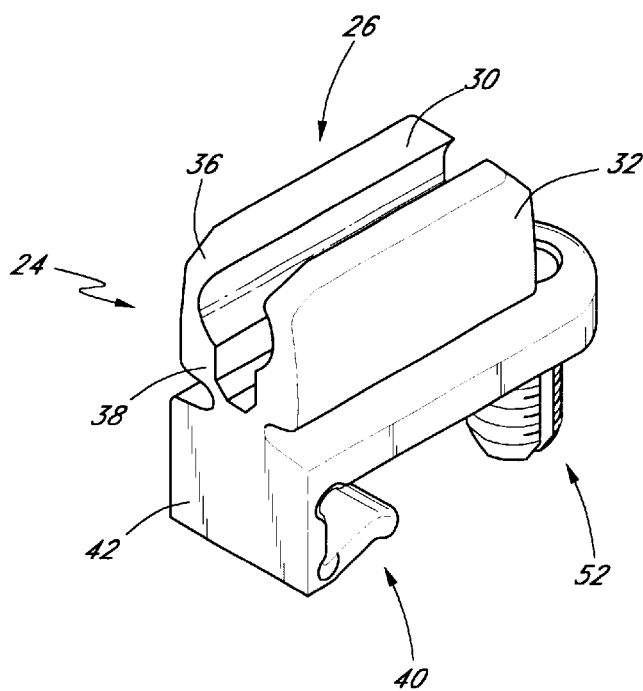
FIG. 6 is a perspective view of an alternate embodiment of a clip, having a molded rivet for attachment to the cross member.
Figure 7:
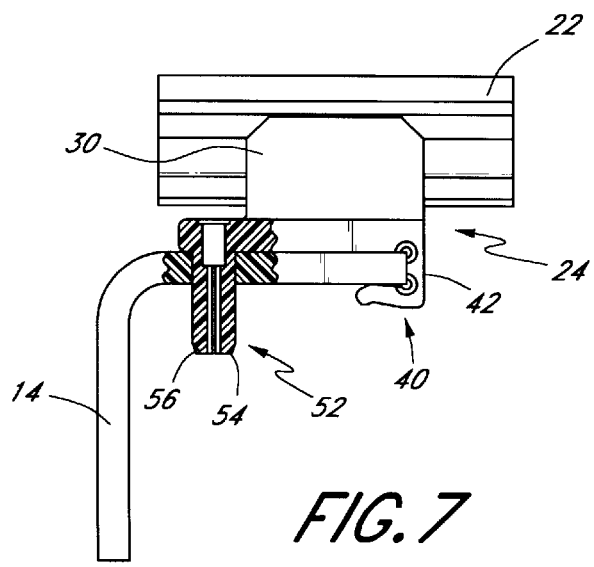
FIG. 7 is a side, partially cutaway, view of the clip illustrated in FIG. 6, mounted on a cross member and having a wear strip mounted thereon.

In an alternate embodiment of the invention, illustrated in FIGS. 6 and 7, a rivet 52 is designed as an integral part of a clip '24. The molded rivet 52 is again used to secure the clip '24 to the cross member 14. In this instance, the hole (not shown) is drilled in the upper flat surface of the cross member 14 as described above, and the clip is attached such that the molded rivet 52 is placed through the hole and the J-shaped clamp 40 grips the front portion of the cross member 14. The molded rivet is ridged and has space between the two halves of the rivet 54, 56, such that it can be compressed and easily inserted through the hole. A pin analogous to the pin 50 in FIG. 5 is inserted through the hollow center of the rivet 52 to spread and maintain the halves 54, 56 in an expanded position to anchor the rivet in place.

Figure 8:
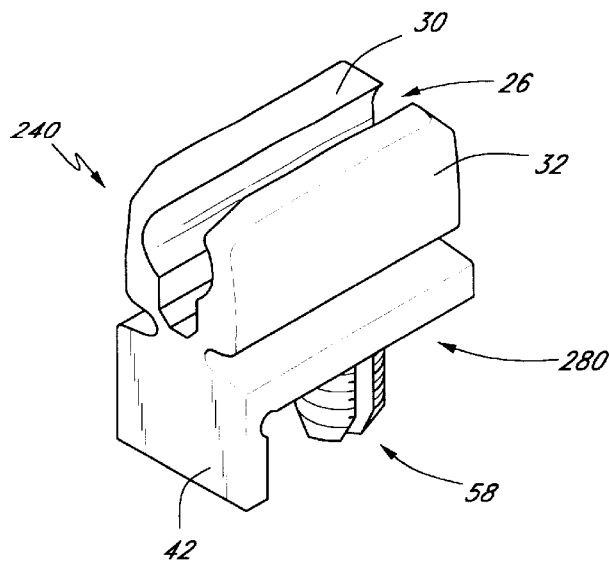
FIG. 8 is a perspective view of another alternate embodiment of a clip, having a button snap for attachment to the cross member.
Figure 9:
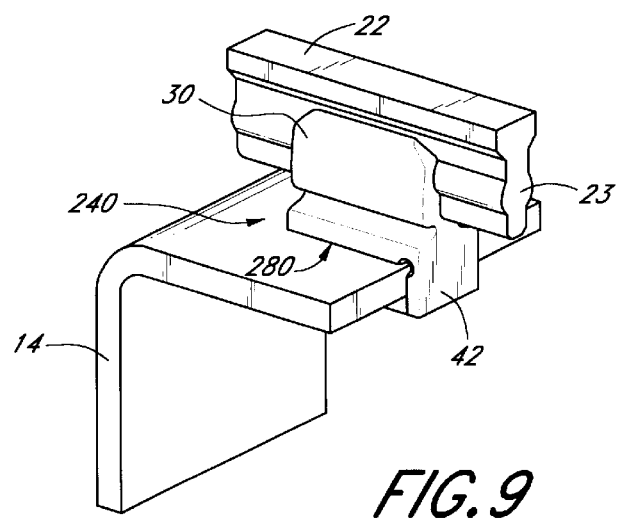
FIG. 9 is a perspective view of the clip of FIG. 8 mounted on a cross member and having a wear strip mounted thereon.
Figure 10:
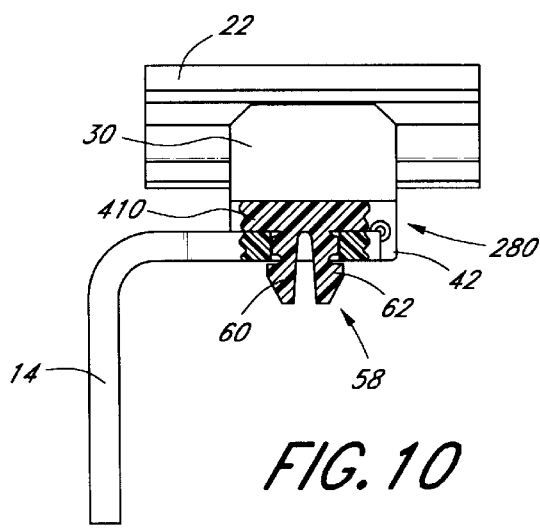
FIG. 10 is a side, partially cutaway, view of the elements of FIG. 9.

In yet another embodiment of the invention, illustrated in FIGS. 8–10, a clip 240 has an upper portion 26 as in FIGS. 2 and 6, but the lower portion 280 has more of an L-shape. A short leg 420 of the L-shaped portion has a flat inner surface engaging the edge of the support 14 to square the clip and resist twisting of the clip. The clip is held in position by a snap or button fastener 58 formed integral with the long leg 410. As seen in FIG. 10, the fastener 58 is centrally located on the long leg 410 since it is the only retaining element. The fastener 58 is formed in two flexible, ridged halves 60, 62. Using force, the halves 60, 62 are compressed and inserted through the hole in the cross member 14. When the two halves 60, 62 pass through the cross member 14 they expand so that tangs on the tips of the halves lock against the lower surface of the cross member, thereby securing the clip 240 to the cross member 14. The fastener could be used on the end of the clip in combination with a J-shape gripping the cross member on the other end. The fastener 58 is useful in combination with a cross member of a particular thickness, but a rivet is more versatile in that it can accommodate cross members of various thicknesses.

Figure 11:
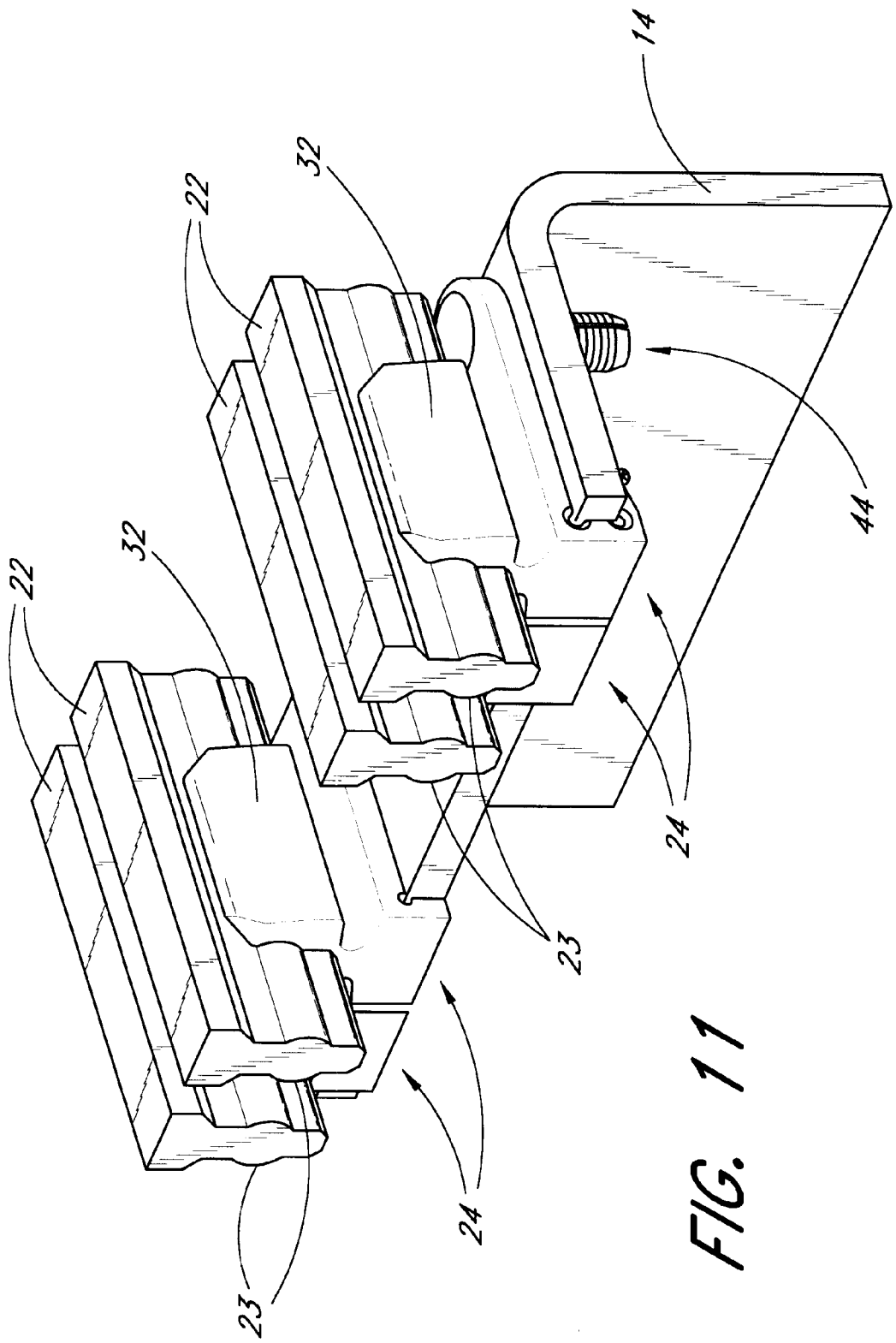
FIG. 11 is a perspective view of multiple clips and wear strips mounted on a single cross member.

In wider conveyor systems, multiple wear strips are necessary. The wear strips 22 are placed adjacent one another to support the wider chain or belt. As illustrated in FIG. 11, the attachment of multiple wear strips 22 to a single cross member 14 can be easily accomplished using the clip 24 described herein. Multiple clips 24 are secured to the cross member 14 using one of the methods described above, and the wear strips 22 mounted in each of the separate clips 24. Multiple clips 24 holding multiple wear strips 22 can provide for a support system for conveyor chains having widths of 50–60 inches or more.

In operation, a plurality of clips 24 are mounted on the cross members 14. As shown in FIG. 1, there are two clips 24 on each cross member 14, but as noted above, multiple clips 24 could be used on each cross member 14 (FIG. 11) for wider conveyor systems. Each clip 24 is mounted on the cross member by first manually pressing the "J" clamp 40 against flat front surface of the cross member 14. The clip 24 is then secured to the cross member 14 by means of a fastener or rivet 44 or similar attachment means. With the clip 124, the built-in rivet is first inserted in the cross member after which the shorter leg of the J-shape is deflected to enable it to be snapped into place over the edge of the support. With the L-shaped lower portion, it is only necessary to snap the fastener 58 into the hole in the cross member. The wear strips 22 are then snapped downwardly into the upper portions of the clip 26, and are held firmly in place by the arms of the clip 30, 32. The arms 30, 32 are spread by the downward force such that the convex surfaces of the wear strip 23 snap into the regions defined by the inner concave surfaces. Each connection is tight and firm, resulting in direct transmission of the weight of the conveyor chain from the wear strips 22 onto the cross members 14.

The embodiments illustrated and described above are provided merely as examples. Changes and modifications can be made from the embodiments presented herein by those skilled in the art without departure from the spirit and scope of the invention, as defined by the following claims.

What is claimed is:

1. A clip for use in a conveyor system, comprising:
   an upper portion adapted to receive an elongate wear strip; and
   a lower portion adapted to be mounted onto a cross member, said lower portion comprising a J-shaped clamp having a first leg and a second leg with a space for receiving said cross member between the first and second legs.

2. The clip of claim 1, wherein said clip is made of acetal synthetic resin.

3. The clip of claim 1, wherein said upper portion comprises two arms in a generally U-shaped configuration, said arms being sufficiently resilient so as to allow the wear strip to be inserted therebetween and to grip said wear strip.

4. The clip of claim 3, wherein said arms have generally concave regions adapted to receive generally convex sides of said wear strip.

5. The clip of claim 1, wherein said lower portion further comprises a hole adapted to receive a rivet for securing said clip to said cross member.

6. The clip of claim 1, wherein said lower portion further comprises a rivet for securing said clip to said cross member.

7. The clip of claim 1, wherein said lower portion further comprises a button snap for securing said clip to said cross member.

8. The clip of claim 1, wherein the J-shaped clamp is sufficiently resilient to expand to accept various thicknesses of an upper flat surface of said cross members and grip said cross member firmly.

9. The clip of claim 1, wherein the clip comprises one or more rivets for securing said clip to said cross member.

10. The clip of claim 1, wherein the J-shaped clamp further comprises a flat front inner surface to engage an edge of the cross member.

11. A rail system for conveyors, comprising:
    an elongate synthetic wear strip;
    a flat or angled cross member; and
    a clip having an upper portion adapted to receive said wear strip and a lower portion comprising a J-shaped clamp for receiving said cross member, whereby the weight of a component borne by said wear strip is transmitted to said cross member
    wherein said wear strip is supported perpendicular to said cross member by said clip.

12. The system of claim 11, further comprising a plurality of clips mounted on a single cross member for supporting a plurality of wear strips.

13. The system of claim 11, wherein said wear strip is shaped in a serpentine configuration.

14. The system of claim 11, wherein the clip is made of acetal synthetic resin.

15. The system of claim 11, wherein the upper portion of the clip snaps onto the wear strip, and wherein the J-shaped clamp snaps onto the cross member.

16. The system of claim 11, wherein said lower portion of said clip further comprises a hole adapted to receive a rivet for securing said clip to said cross member.

17. The system of claim 11, wherein said lower portion further comprises a rivet for securing said clip to said cross member.

18. The system of claim 11, wherein said lower portion further comprises a button snap for securing said clip to said cross member.

19. The system of claim 11, wherein cross members extend horizontally between side frames of a conveyor system.

20. A clip for use in a conveyor system, comprising:
an upper portion configured to grip an elongate wear strip; and
a lower portion having a first leg engaging a flat upper surface of a cross member, a second leg engaging a flat edge of the cross member, the flat edge being substantially perpendicular to the upper surface of the cross member, and said lower portion having attachment means for further securing said clip to said cross member.

21. The system of claim 20, wherein the attachment means comprises at least one rivet.

22. The system of claim 20, wherein the attachment means comprises a faster formed integral with said first leg and adapted to extend through a hole in the cross member.

23. The system of claim 20, wherein the attachment means comprises at least one hole adapted to receive a fastener.

24. The system of claim 20, wherein said lower portion comprises a J-shaped clamp.

25. The system of claim 24, wherein the J-shaped clamp and said attachment means provide a squaring effect to allow said clip to resist lateral forces once mounted on said cross member.

26. The system of claim 20, wherein said lower portion has an L-shape.

27. The system of claim 20, wherein the upper and lower portions are arranged to support a wear strip substantially perpendicular to a cross member.

28. A clip for use in a conveyor system, comprising:
an upper portion adapted to receive an elongate wear strip;
a lower portion adapted to be mounted onto a cross member, said lower portion comprising a J-shaped clamp for receiving said cross member; and
a button snap for securing said clip to said cross member.

29. A rail system for conveyors, comprising:
an elongate synthetic wear strip;
a flat or angled cross member;
a clip having an upper portion adapted to receive said wear strip and a lower portion comprising a J-shaped clamp for receiving said cross member, whereby the weight of a component borne by said wear strip is transmitted to said cross member; and
a button snap for securing said clip to said cross member.

30. A clip for use in a conveyor system, comprising:
an upper portion configured to grip an elongate wear strip;
a lower portion having a first leg engaging a flat upper surface of a cross member, a second leg engaging a flat edge of the cross member, and attachment means for further securing said clip to said cross member; and
a fastener formed integral with said first leg and adapted to extend through a hole in the cross member.

31. A clip for use in a conveyor system, comprising:
an upper portion configured to grip an elongate wear strip;
a lower portion having a first leg engaging a flat upper surface of a cross member, a second leg engaging a flat edge of the cross member, and attachment means for further securing said clip to said cross member, said lower portion further comprising a J-shaped clamp;
wherein the J-shaped clamp and said attachment means provide a squaring effect to allow said clip to resist lateral forces once mounted on said cross member.

32. A clip for use in a conveyor system, comprising:
an upper portion adapted to receive an elongate wear strip;
a lower portion adapted to be mounted onto a flat or angled cross member, said lower portion comprising first and second legs for receiving said cross member such that a wear strip is supported substantially perpendicular to a cross member.

33. The clip of claim 32, wherein the upper portion comprises channel walls having generally concave regions adapted to receive generally convex sides of a wear strip.

34. The clip of claim 33, wherein the channel walls are sufficiently resilient to allow a wear strip to be inserted therebetween, and to grip the wear strip.

35. The clip of claim 32, wherein the first leg further comprises a hole for receiving a fastener.

36. The clip of claim 32, wherein the second leg is biased toward said first leg.

37. The clip of claim 32, wherein the second leg is sufficiently resilient to expand to accept cross members of various thicknesses and to grip a cross member firmly.

* * * * *